United States Patent
Cohen et al.

(10) Patent No.: US 8,046,337 B2
(45) Date of Patent: Oct. 25, 2011

(54) PRESERVATION AWARE FIXITY IN DIGITAL PRESERVATION

(75) Inventors: Simona Cohen, Haifa (IL); Dalit Naor, Tel-Aviv (IL); Leeat Ramati, Tell-Aviv (IL); Petra Reshef, Kfar-Saba (IL); Shahar Ronen, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 12/251,842

(22) Filed: Oct. 15, 2008

(65) Prior Publication Data

US 2010/0094907 A1    Apr. 15, 2010

(51) Int. Cl.
*G06F 7/00*     (2006.01)
*G06F 17/00*    (2006.01)

(52) U.S. Cl. ........ 707/661; 707/690; 707/694; 707/698; 707/956

(58) Field of Classification Search ........................ None
See application file for complete search history.

(56) References Cited

U.S. PATENT DOCUMENTS

| | | | |
|---|---|---|---|
| 4,309,569 A * | 1/1982 | Merkle | ......................... 713/177 |
| 6,606,693 B1 | 8/2003 | Morris | |
| 6,691,309 B1 | 2/2004 | Lorie | |
| 7,212,322 B2 | 5/2007 | Abhyankar et al. | |
| 7,305,393 B2 | 12/2007 | Seeger et al. | |
| 2007/0271258 A1 | 11/2007 | Martin et al. | |
| 2007/0283417 A1 | 12/2007 | Smolen et al. | |

FOREIGN PATENT DOCUMENTS

EP    1195734 B1    2/2008

OTHER PUBLICATIONS

Marc Schneider et al., A Robust Content Based Digital Signature for Image Authentication, IEEE, Sep. 16-19, 1996, pp. 227-230, vol. 3.
Carl Rauch et al., Preserving Digital Media: Towards a Preservation Solution Evaluation Metric, ICADL 2004, pp. 203-212.
Jana Dittman et al., Content—based Digital Signature for Motion Pictures Authentication and Content—Fragile Watermarking, German National Research Center for Information Technology, Institute (IPSI), IEEE 2004, pp. 209-213.
Ralph C. Merkle, A Digital Signature Based on a Conventional Encryption Function, 1998, 10Pgs, Spinger-Verlag.
Federal Register, vol. 72, No. 212, Friday, Nov. 2, 2007, pp. 62212-62220.

* cited by examiner

*Primary Examiner* — Pierre M Vital
*Assistant Examiner* — Jason Liao
(74) *Attorney, Agent, or Firm* — Cantor Colburn LLP; Suzanne Erez

(57) ABSTRACT

A computer based method for the preservation of a digital information in a data set includes receiving a data set to be preserved, the data set including a plurality of preservation objects; creating a fixity table, the fixity table including one or more data types corresponding to preservation data types contained in the preservation objects, each data type being assigned an importance rank and one or more fixity function; for each preservation object, creating a Merkle tree corresponding to the preservation object and based on the fixity table.

15 Claims, 6 Drawing Sheets

PRESERVATION AWARE FIXITY IN DIGITAL PRESERVATION

BACKGROUND

The present invention relates to digital preservation, and more specifically, to preservation aware fixity computations in a digital preservation system.

Long term digital preservation ("preservation" for short) is the ability to sustain the understandability and usability of digital objects in the distant future regardless of changes in technologies and in the "designated communities" that use these digital objects (that is, the data consumers). Digital objects include, but are not limited to, text documents, data files, audio/visual files and other types of information stores. The core standard for digital preservation systems is the Open Archival Information System (OAIS), which is an International Organization for Standardization (ISO) standard. OAIS specifies the terms, concepts and reference models for a system dedicated to preserving digital assets for a designated community.

One of the main concepts in OAIS is the Archival Information Package (AIP), which is the basic object stored in a preservation system. FIG. 1 shows an example representation of an AIP 100 according to the OAIS standard. The AIP 100 includes a content information compartment 102 and one or more preservation description information (PDI) compartments 104. For clarity, only one PDI compartment 104 is shown in FIG. 1.

More specifically, the content information compartment 102 includes content information in the form of a content data object 106. The content data object 106, is the raw data that is the focus of the preservation. The content information compartment 102 also includes representation information 108 (RepInfo) which is needed to render the object intelligible to its designated community. This may include information regarding the hardware and software environment needed to view the content data object 106.

The PDI compartment 104 includes additional metadata focused on describing the past and present states of the content information 102, ensuring it is uniquely identifiable and that it has not been altered in an undocumented manner. In particular, the PDI compartment 104 includes a reference field 110 that contains identifiers for the content information. At least one of these identifiers should be globally unique and persistent.

The PDI compartment 104 also includes a provenance field 112 that documents the history and the origin of the content information and any changes that may have taken place since it was originated. Provenance information also documents who has had custody of the content information since it was originated. The PDI compartment 104 also includes a context field 114 that documents the reasons for the creation of the content information and relationships to its environment. The PDI compartment 104 also includes a fixity field 116 that demonstrates that the particular content information has not been altered in an undocumented manner. The term "fixity" may also be referred to as an integrity check. In addition, the PDI compartment 104 includes a PDI representation field 118, this may include information regarding the hardware and software environment needed to view the information stored in the PDI compartment 104.

Most prior art has related to preservation only and does not deal with fixity computations. Other related work discusses fixity but it is not preservation-aware. If the fixity computation is not preservation-aware the fixity computations may become obsolete as time passes.

SUMMARY

According to one embodiment of the present invention, a computer based method for the preservation of digital information in a data set is provided. The method of this embodiment includes receiving a data set to be preserved, the data set including a plurality of preservation objects; creating a fixity table, the fixity table including one or more data types corresponding to preservation data types contained in the preservation objects, each data type being assigned an importance rank and one or more fixity functions. The method of this embodiment also includes, for each preservation object, creating a Merkle tree corresponding to the preservation object and based on the fixity table, creating including: creating a root node for the Merkle tree which is associated with the preservation object; creating branch nodes from the root node for each portion of the preservation object; assigning an importance rank to each branch node; calculating a fixity value for each branch node based on the importance rank of the branch node and a fixity function stored in the fixity table; and storing the fixity value in an inner node connected to the branch node.

Another embodiment of the present invention is directed to a system for the preservation of digital information contained in a computing system to ensure later retrieval. The system of this embodiment includes a data set to be preserved, the data set including a plurality of preservation objects and being stored in a computer memory; a fixity table, the fixity table including one or more data types corresponding to preservation data types contained in the preservation objects, each data type being assigned an importance rank and one or more fixity function; and a plurality of Merkle trees corresponding to the preservation objects and based on the fixity table, each Merkle tree including a root node associated the preservation object, branch nodes from the root node for each portion of the preservation object, and additional nodes, the branch nodes and the additional nodes each including an importance rank, wherein each Merkle tree includes, stored in an inner node connected at least one of the branch nodes, a fixity value for each branch node based on the importance rank of the branch node and a fixity function stored in the fixity table.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

While, fixity computations can be done in various components of the preservation system, embodiments of the present invention are directed to conducting fixity computations within the storage object. Computing the fixity within the storage object ensures a consistent implementation for all objects; it also prevents unnecessary data transfers, thus improving overall system performance. In addition, the storage object may perform data transformations, which change the fixity value; hence, the storage needs to "know" how to calculate fixity.

The fixity may be sometimes computed via simple functions, such as a cyclical redundancy check (CRC), which are considered "cheap" in execution time and space. In other instances, cryptographically stronger and more "expensive" cryptographic hash functions, such as MD5 or SHA-512 may be used in fixity calculation. However, no matter how strong the current fixity computation functions are, they are likely to break or become weaker (i.e. become obsolete) in the distant future, as better functions are made available thanks to the attainability of stronger computing power at a much lower cost. For example, the SHA-1 algorithm has recently been compromised by cryptography researchers and, thus, National Institute of Standards and Technology (NIST) has recommended using alternative hashing algorithms and is initiating a proposal for a new algorithm.

Embodiments of the present invention provide an effective fixity computation in a long-term preservation environment. In one embodiment, a fixity computation method that is aware of the preservation object's structure, as well as the importance rank of the object's various compartments over time may be employed. In addition, embodiments of the present invention may allow the dynamic upload and use of new fixity functions in the future, to replace existing functions that have become obsolete. As such, embodiments of the present invention may provide better protection for data with high value, even when hardware, algorithms, and applications become obsolete.

It will be understood that the present invention may be implemented on a computing device such as a personal computer or the like. In addition, the data structures for preservation aware fixity may be stored in any type of storage medium.

Figure 2:
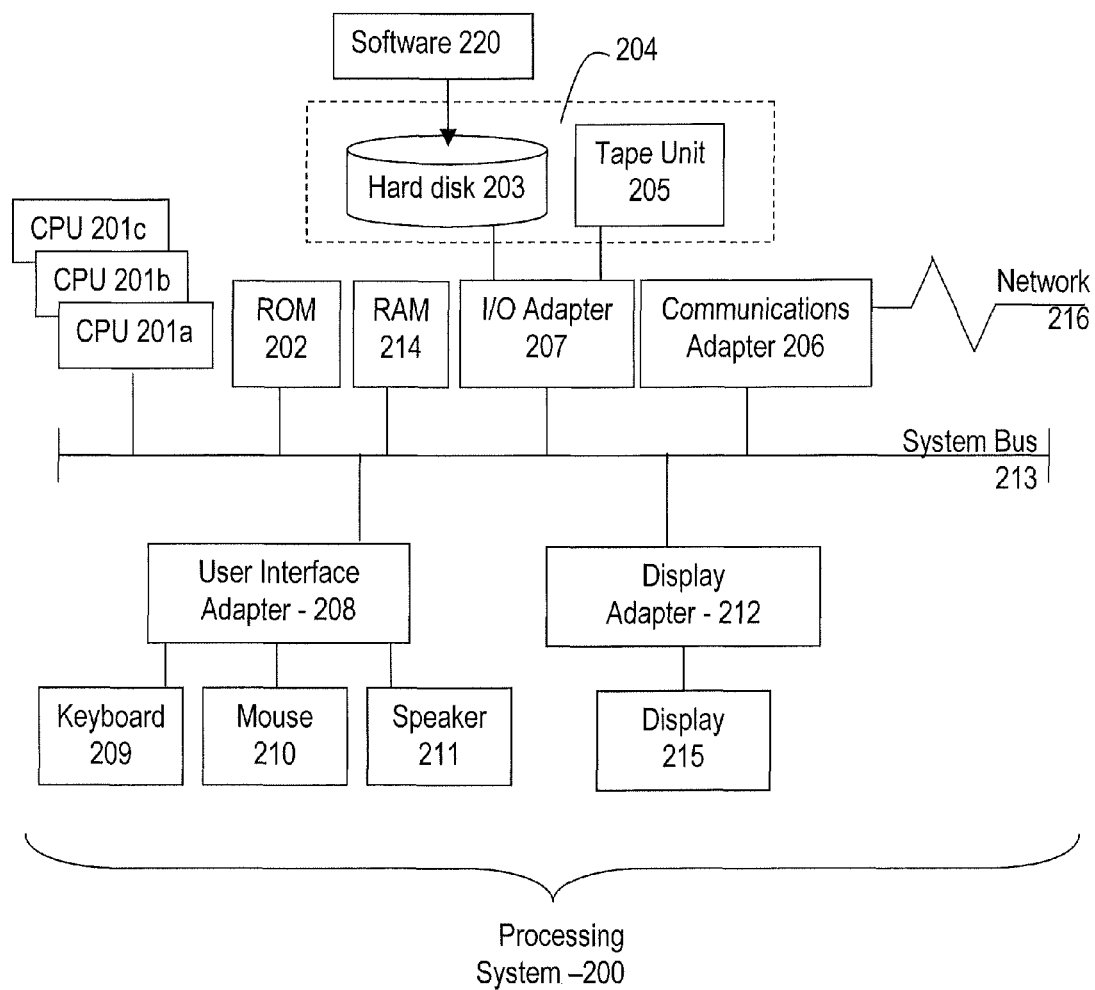
FIG. 2 shows an example of processing system according to one embodiment of the present invention.

Referring to FIG. 2, there is shown an embodiment of a processing system 200 for implementing the teachings herein. In this embodiment, the system 200 has one or more central processing units (processors) 201a, 201b, 201c, etc. (collectively or generically referred to as processor(s) 201). In one embodiment, each processor 201 may include a reduced instruction set computer (RISC) microprocessor. Processors 201 are coupled to system memory 214 and various other components via a system bus 213. Read only memory (ROM) 202 is coupled to the system bus 213 and may include a basic input/output system (BIOS), which controls certain basic functions of system 200.

FIG. 2 further depicts an input/output (I/O) adapter 207 and a communications (network) adapter 206 coupled to the system bus 213. I/O adapter 207 may be a small computer system interface (SCSI) adapter that communicates with a hard disk 203 and/or tape storage drive 205 or any other similar component. I/O adapter 207, hard disk 203, and tape storage device 205 are collectively referred to herein as mass storage 204. The mass storage 204 may, in some embodiments of the present invention, store the digital objects as well as the preservation and fixity information associated therewith disclosed herein.

The communications adapter 206 interconnects bus 113 with an outside network 216 enabling data processing system 200 to communicate with other such systems. As such, the digital objects as well as the preservation and fixity information associated therewith, disclosed herein, may be alternatively or additionally stored in mass storage on another processing system.

A screen (e.g., a display monitor) 215 is connected to system bus 213 by display adaptor 212, which may include a graphics adapter to improve the performance of graphics intensive applications and a video controller. In one embodiment, adapters 207, 206, and 212 may be connected to one or more I/O busses that are connected to system bus 213 via an intermediate bus bridge (not shown). Suitable I/O buses for connecting peripheral devices, such as hard disk controllers, network adapters, and graphics adapters typically include common protocols, such as the Peripheral Components Interface (PCI). Additional input/output devices are shown as connected to system bus 213 via user interface adapter 208 and display adapter 212. A keyboard 209, mouse 210, and speaker 211 all interconnected to bus 213 via user interface adapter 208, which may include, for example, a Super I/O chip integrating multiple device adapters into a single integrated circuit.

Figure 1:
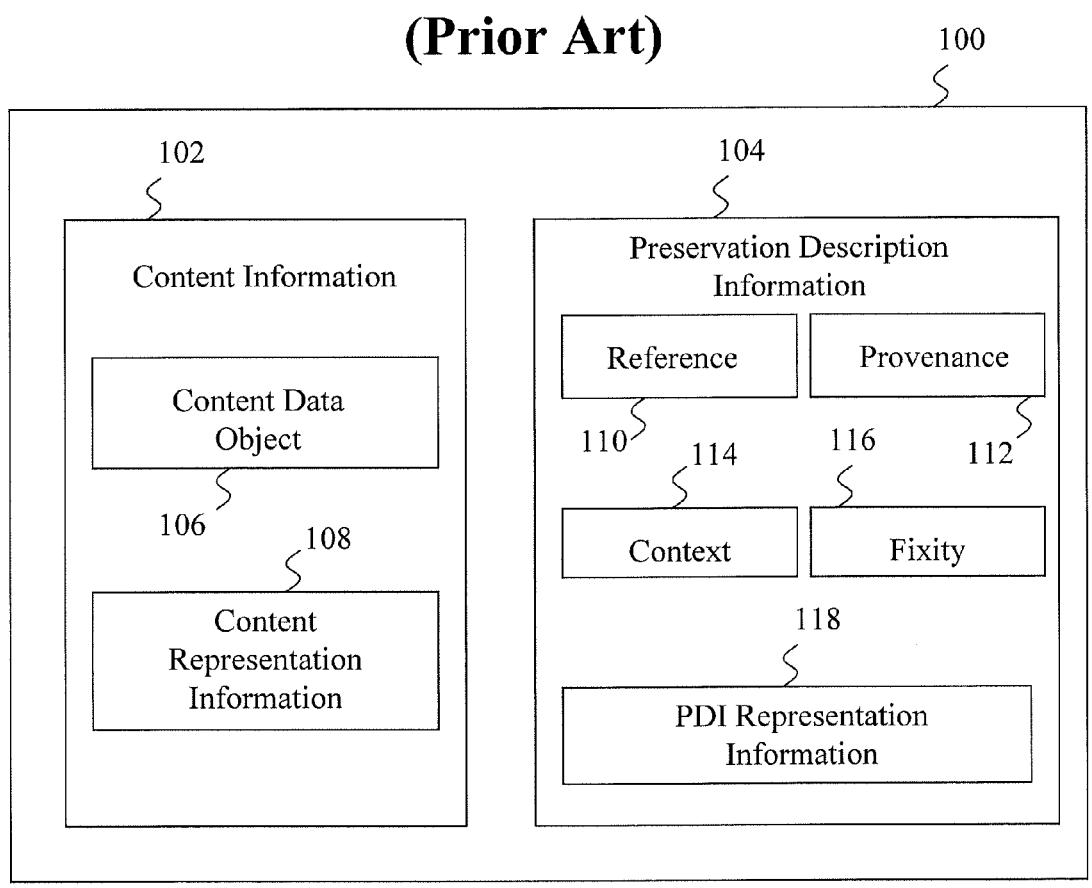
FIG. 1 shows a prior art archival information package according to an open archival information system.

Thus, as configured in FIG. 2, the system 200 includes processing means in the form of processors 201, storage means including system memory 214 and mass storage 204, input means such as keyboard 209 and mouse 210, and output means including speaker 211 and display 215. In one embodiment, a portion of system memory 214 and mass storage 204 collectively store an operating system such as the AIX® operating system from IBM Corporation to coordinate the functions of the various components shown in FIG. 1.

It will be appreciated that the system 200 can be any suitable computer or computing platform, and may include a terminal, wireless device, information appliance, device, workstation, mini-computer, mainframe computer, personal digital assistant (PDA) or other computing device.

Examples of operating systems currently supported by the system 200 include Windows 95, Windows 98, Windows NT 4.0, Windows XP, Windows 2000, Windows CE, Windows Vista, Macintosh, Java, LINUX, and UNIX, or any other suitable operating system. Of course, other operating systems may be created in the future. Thus, according to embodiments of the present invention, information related to stored data objects may include indications of the operating system and programs used to create or edit the data objects.

The system 200 also includes a communications interface 206 for communicating over a network 216. The network can be a local-area network (LAN), a metro-area network (MAN), or wide-area network (WAN), such as the Internet or World Wide Web.

Users of the system 200 can connect to the network through any suitable communications interface 106 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 200 includes machine readable instructions stored on machine readable media (for example, the hard disk 204) for capture and interactive display of information shown on the screen 115 of a user. As discussed herein, the instructions are referred to as "software" 220. The software 220 may be produced using software development tools as are known in the art.

As discussed above, the systems and method of the present invention include a fixity computation method which is aware of the preservation object's structure, as well as the importance rank of the object's various compartments over time. In addition, the proposed method allows the dynamic upload and use of new fixity functions in the future, to replace existing functions that have become obsolete. This method provides better protection for data with high value, even when hardware, algorithms, and applications become obsolete.

Figure 3:
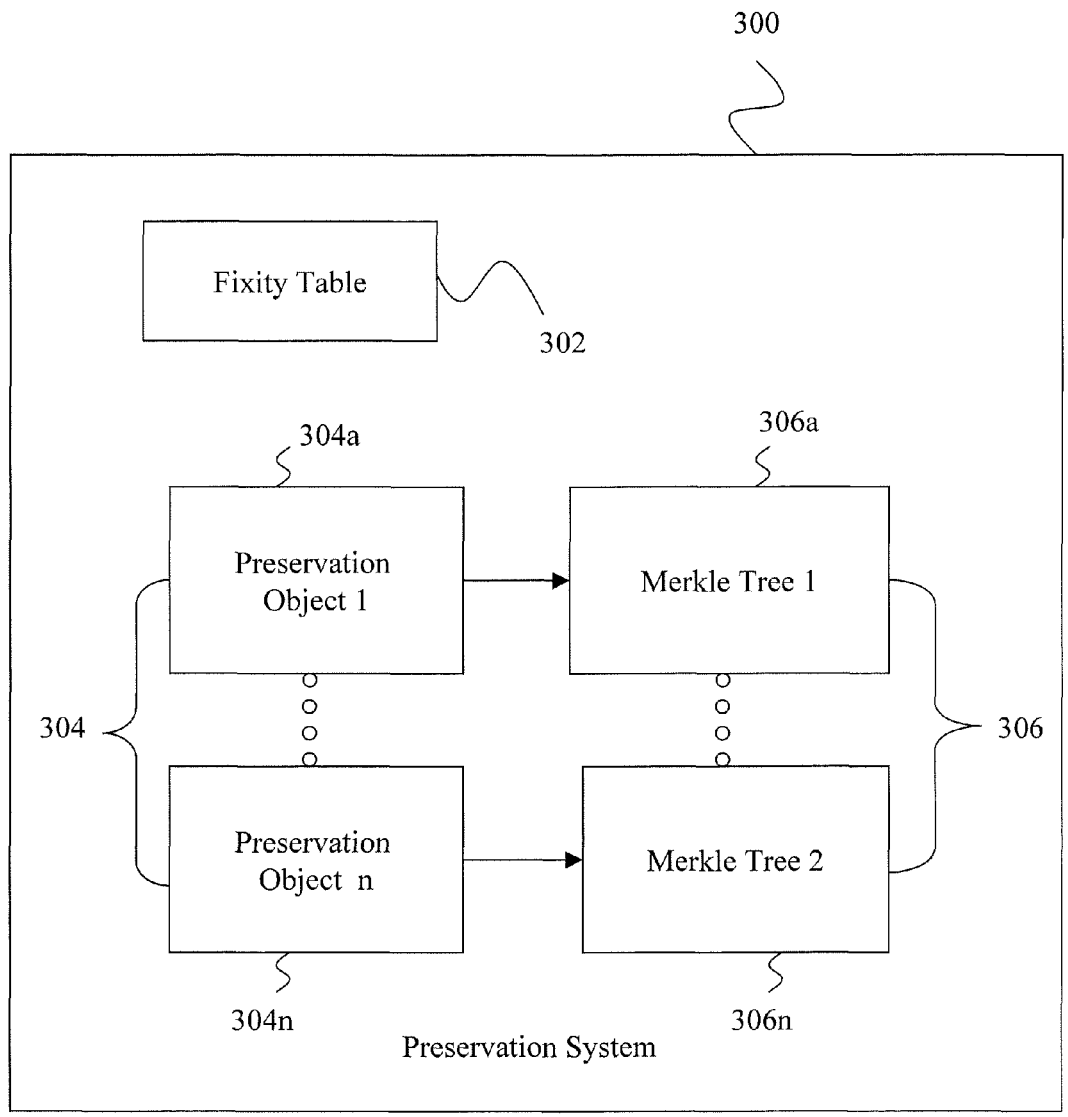
FIG. 3 shows an example of a system according to an embodiment of the present invention.

FIG. 3 shows an example of a preservation system 300 according to one embodiment of the present invention. The system includes a fixity table 302. The fixity table 302 may include an importance rank for each data type as well as one or more preferred fixity functions for the data type. As a rule, the more important the data type, the stronger the fixity function assigned to it. The meaning of multiple functions for the same data type is to compute the fixity of the data for each fixity function listed. By doing this, greater data protection is provided.

Table 1 shows an example of a fixity table 302 that may be implemented in one embodiment of the present invention. In Table 1, the data types refer to a limited number of content data types. Of course, other types of content (or preservation) data could be included in the table.

TABLE 1

| Data Type | Data Importance Rank | Fixity Function |
| --- | --- | --- |
| Text content data | 5 | SHA-512 |
| Image content data | 5 | Watermark |
| Binary content data interval | 5 | SHA-512, MD5 |
| Content RepInfo1 | 5 | MD5 |
| Content RepInfo2 (Redundant RepInfo) | 1 | CRC |
| Context | 3 | CRC |
| Reference | 3 | Reed-Solomon |

The use of different fixity functions for different parts of the object is needed to support preservation. For example, in the event that a weakness is later discovered in some function (i.e., if hackers broke SHA-1) a recomputation of the fixity with a new improved function (for example, SHA-512 instead of SHA-1) may be needed. Such an operation is computationally expensive and thus, should only be done when necessary. According to embodiments of the present invention, utilizing the importance rank as an indicator for what should and should not be recomputed may reduce such computations. For example, because RepInfo has higher importance than the context data in Table 1, only RepInfo may have its fixity recomputed.

Some fixity functions can be applied only to specific types of data, e.g., some watermarks can only be used to compute the fixity of images, or even only images of a specific domain. Another example is Reed-Solomon error correcting function that should be applied only to data with fixed small length. A data type can be a compartment in the preservation object structure e.g., AIP RepInfo, or it can be an interval within a compartment in the preservation object structure e.g., binary content data interval. The same type of data may have a specific importance rank in one preservation object and another importance rank in another preservation object. Thus, the fixity function table may have several rows for the same data type with different importance ranks. Each preservation object will use its adequate row.

The preservation system also includes a plurality of preservation objects 304. In one embodiment, the preservation objects 304 may be in the form of OAIS AIP. For each preservation object 304a . . . 304n a corresponding Merkle tree 306 is constructed. For example, preservation object 304a has Merkle tree 306a constructed there from and preservation object 304n has Merkle tree 306n constructed there from.

Merkle trees are a type of data structure which contains a tree of summary information about a larger piece of data—for instance a preservation object—used to verify its contents. According to one embodiment, the inner nodes "summary information" includes the fixity computation of its direct children. The tree is used to produce one short value for many leaves, as this short value needs to be preserved outside the system for future validations.

Figure 4:
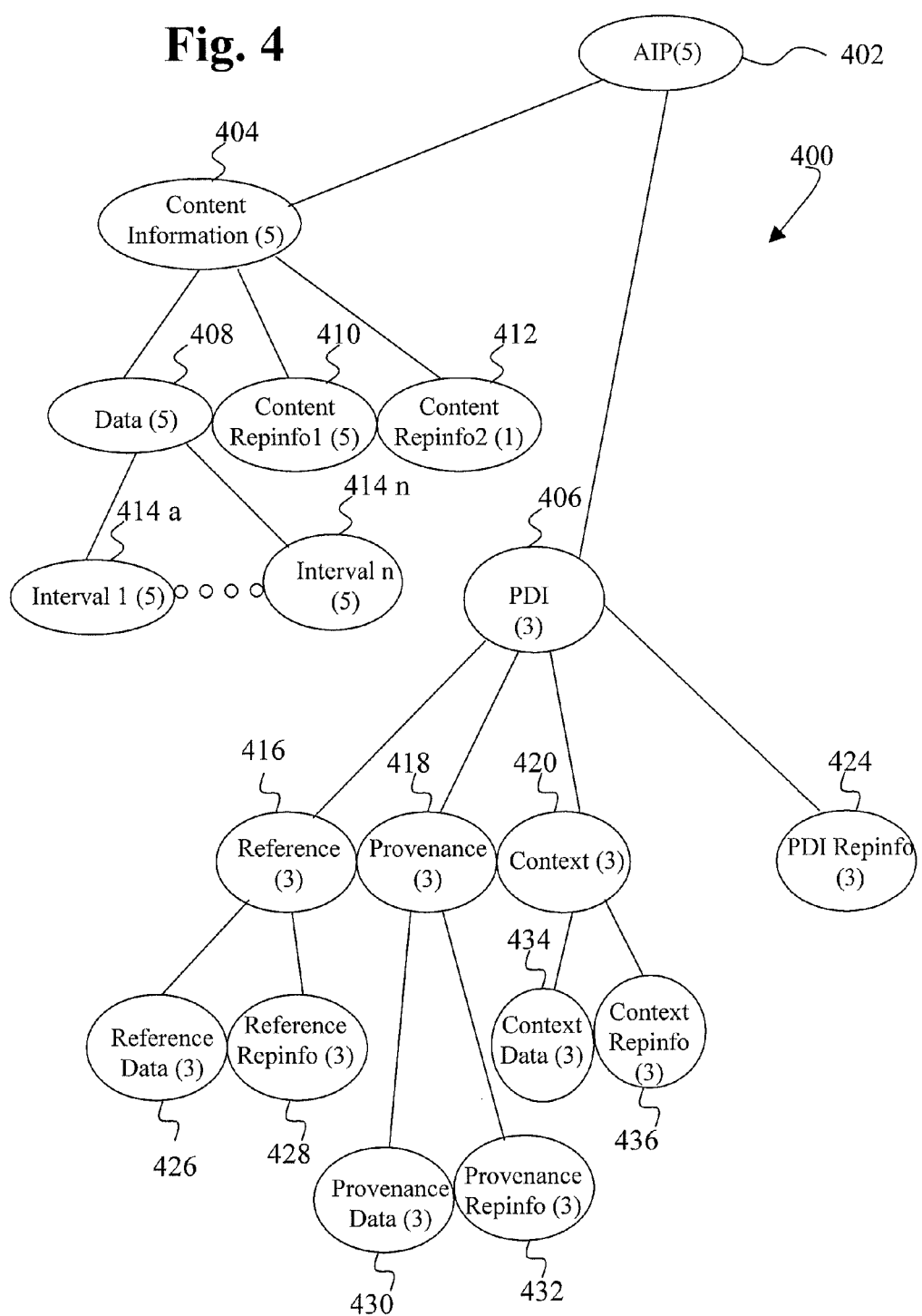
FIG. 4 shows an example of a Merkle tree that may be utilized in an embodiment of the present invention.

FIG. 4 shows one embodiment of a Merkle tree 400 that may be created for a preservation object based on the OAIS AIP structure. Of course, different structures could be created based on the preservation object.

The tree 400 includes a root node 402 that corresponds to the preservation object to which it is related. In this example, the root node 402 is associated with an OAIS AIP. The root node 402 includes two branches to a content information node 404 and a preservation description information (PDT) node 406. The content information node 404, in this example, branches into a data node 408 and two content representation nodes 410 and 412. In one embodiment, the data node 408 may be broken into intervals as indicated by the branches to interval nodes 414a . . . 414n.

The PDI node 406 may branch into multiple nodes. For example, the PDI node 406 may branch into a reference node 416, a provenance node 418, a context node 420, and a PDI representation information node 424. Likewise, each of these nodes may also branch into other nodes. For example, the reference node 416 may branch into a reference data node 426 and reference representation node 428. The provenance node 418 may branch into a provenance data node 430 and a provenance representation information node 432. The context node 420 may branch into a context data node 434 and a context representation information node 436.

Each of the nodes in this example has been given an "importance rank" which is included in the node in "(x)" format, where x is an integer. The importance rank shown in FIG. 4 corresponds to those shown in Table 1 above. Of course, the importance rank may vary and is user configurable though the fixity table. That is, each node type is assigned an importance rank. If a particular node type is not assigned a particular importance rank, in one embodiment, that node type is given a default importance rank. In one embodiment, the importance rank may be assigned by the storage component itself. In another embodiment, the importance rank may be a combination of the fixity table and the storage component itself.

Figure 5:
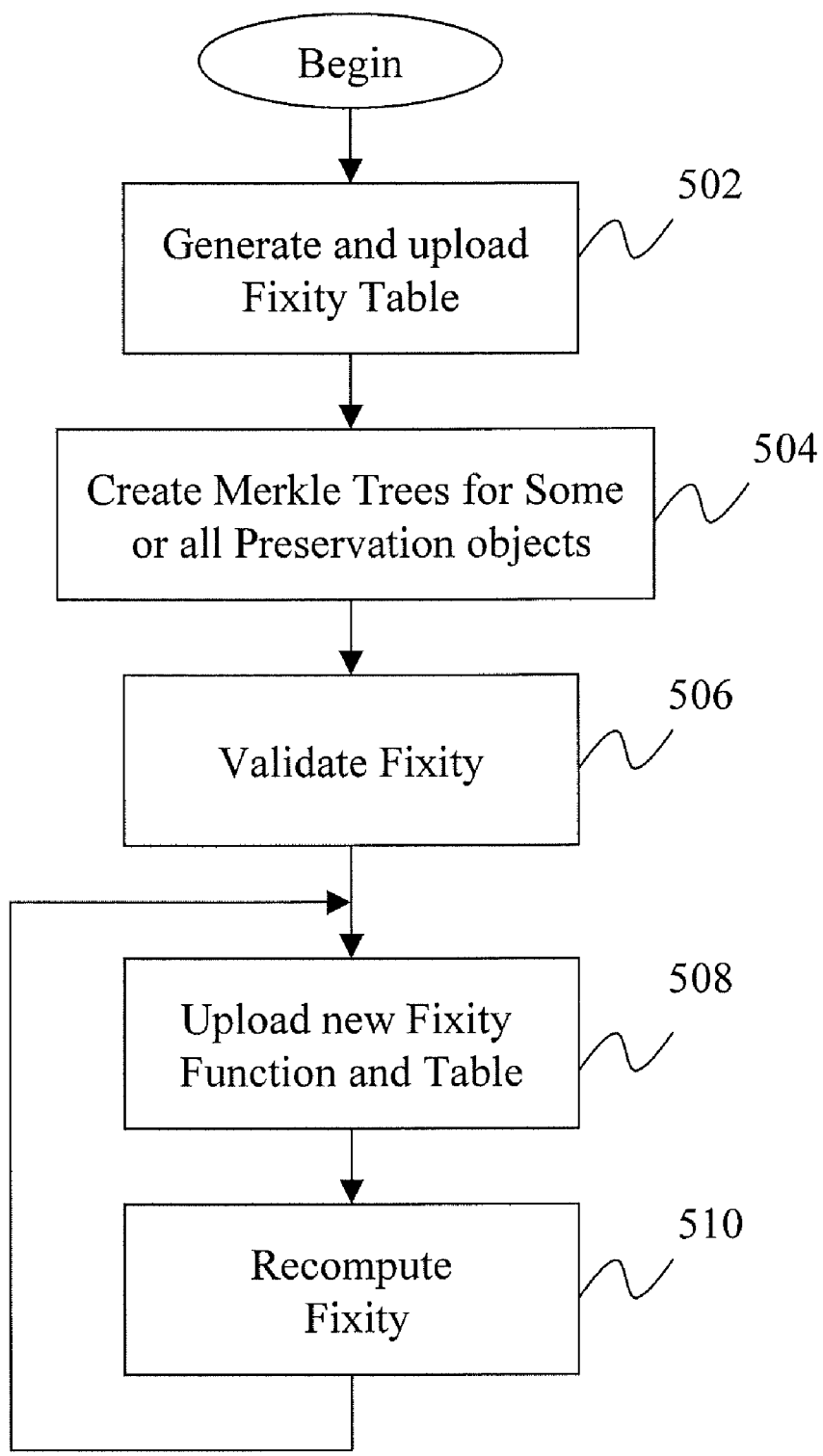
FIG. 5 shows an example of a method for preservation aware fixity computations according to an embodiment of the present invention.

FIG. 5 shows an example of a method of maintaining preservation aware fixity in a preservation system according to one embodiment of the present invention. At a block 502 a fixity table is generated and uploaded to the preservation system. An example of a fixity table is shown above at Table 1. Of course, other types of fixity tables may be created and the contents data types contained therein will track the particular preservation object in preservation system. Further, embodiments of the present invention may support multiple types of preservation objects. As such, the table may contain information for the contents data types of multiple preservation objects.

At a block 504 a Merkle tree is created for some or all of the preservation objects in the preservation system. More details of the creation of the Merkle tree are described with respect to FIG. 6.

Figure 6:
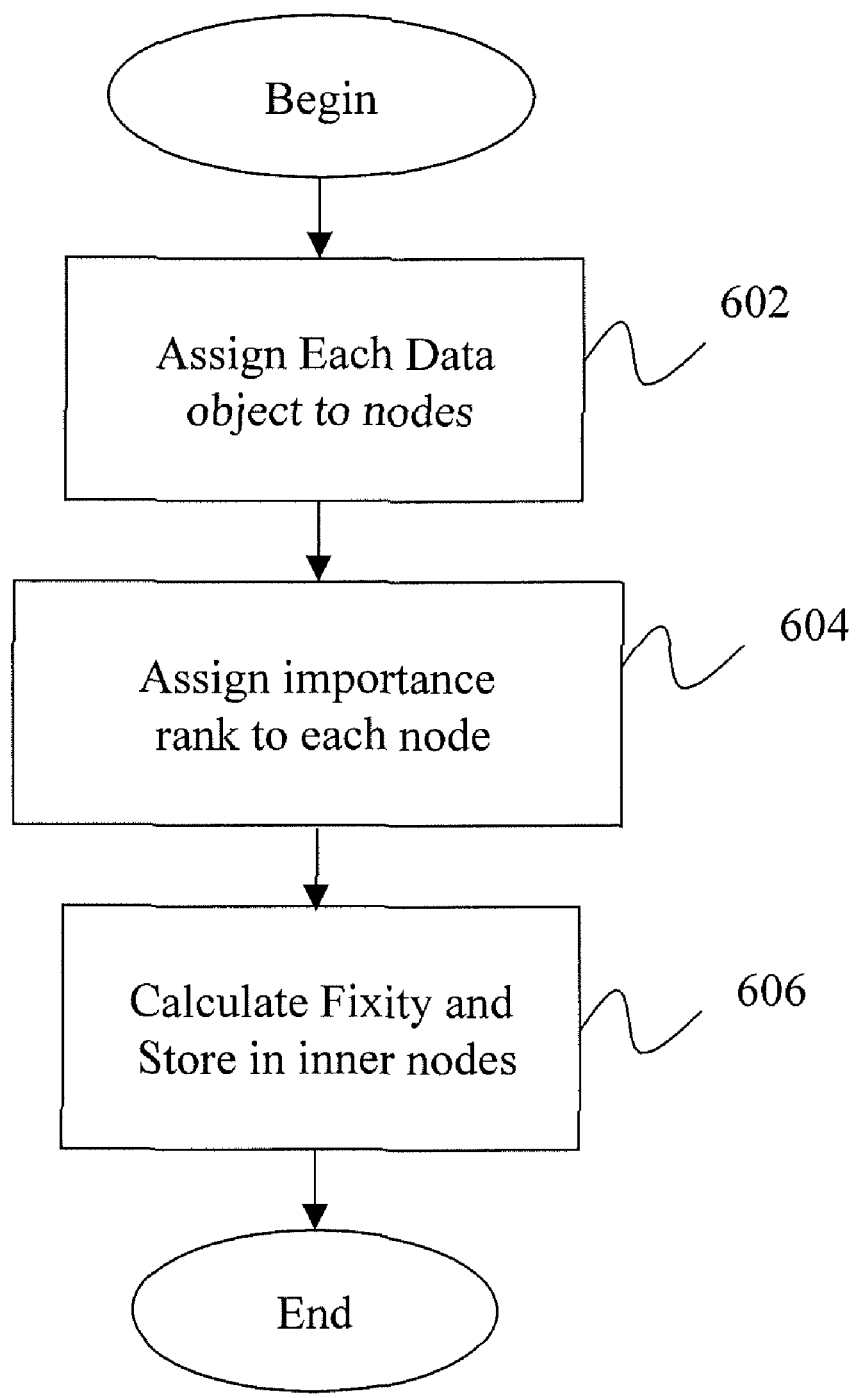
FIG. 6 shows a method by which a Merkle tree may be created for a particular preservation object that is part of received data set according to one embodiment of the present invention.

FIG. 6 shows a method by which a Merkle tree may be created for a particular preservation object that is part of received data set according to one embodiment of the present invention. At a block 602 each level of the preservation object is given a node and sub-nodes from those nodes are created. For example, the preservation object itself may be the root node and nodes representing content information and PDI information as shown in FIG. 3 may define the next level down the tree.

At a block 604 an importance rank is assigned to each node in the Merkle tree. The importance rank may be assigned by either the preservation system administrator, the storage component, or may be a combination of both.

At a block 606 the fixity of each node is computed using the fixity table and the results are stored in the Merkle tree inner node from which the node depends. Of course, the root node may have its fixity stored in itself or may not include a fixity. In case the fixity table includes multiple functions for the same node, the fixity of the data mapped to this node may be computed once for each fixity function listed; by doing this, greater data protection is provided.

Referring again to FIG. 5, after the Merkle trees have been created, in the event that a fixity validation request is triggered, the fixity is re-computed at a block 506. If the result turns out to be invalid, the system can find the specific piece of data that were altered and invalidated fixity. Fixity validation may be done with a previous result kept within or outside the storage component.

When a fixity function becomes obsolete, at a block 508, a new fixity function is added and the fixity table is updated to reflect the new function and the function that has become obsolete is deleted. In one embodiment, the importance rank in the fixity table may also be adjusted. At a block 510, each preservation object with an obsolete fixity function has its fixity recomputed according to the updated fixity table. In one embodiment, processing returns to block 508 to await further updates to table.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer based method for the monitoring of digital information in a data set, the method comprising:
   receiving a data set to be preserved, the data set including a plurality of preservation objects;
   creating a fixity table, the fixity table including one or more data types corresponding to preservation data types contained in the preservation objects, each data type being assigned an importance rank and one or more fixity functions; and
   for each preservation object, creating a Merkle tree corresponding to the preservation object and based on the fixity table, creating including:
     creating a root node for the Merkle tree which is associated with the preservation object;
     creating branch nodes from the root node for each portion of the preservation object;
     assigning an importance rank to each branch node;
     calculating a fixity value for each branch node based on and a fixity function stored in the fixity table; and
     storing the fixity value in an inner node connected to the branch node as a stored fixity value;
   receiving a fixity validation request;
   recomputing the fixity value for each branch node to form a recomputed fixity value; and
   comparing the stored fixity value to the recomputed fixity value to determine if the preservation object has been altered.

2. The method of claim 1, further comprising:
   determining that one or more of the fixity functions has become obsolete; and
   updating the fixity table to replace the obsolete fixity function.

3. The method of claim 2, further comprising:
   recalculating the fixity value for each value of each branch node that had an importance value assigned to the fixity function that changed.

4. The method of claim 1, further comprising:
   retrieving the Merkle tree;
   decoding a content object portion of the Merkle tree; and
   displaying the content object to a user on a graphical user interface.

5. The method of claim 4, wherein retrieving includes a receiving a request to retrieve a content data object stored in the Merkle tree.

6. The method of claim 1, wherein all of the preservation objects are Open Architecture Information System Archival Information Packages.

7. The method of claim 1, wherein at least one of the preservation objects is not an Open Architecture Information System Archival Information Package.

8. The method of claim 1, wherein the preservation object includes content information and preservation descriptive information.

9. A system for the monitoring of digital information contained in a computing system to ensure later retrieval, the system comprising:
- a data set to be preserved, the data set including a plurality of preservation objects and being stored in a computer memory;
- a fixity table, the fixity table including one or more data types corresponding to preservation data types contained in the preservation objects, each data type being assigned an importance rank and one or more fixity function; and
- a plurality of Merkle trees corresponding to the preservation objects and based on the fixity table, each Merkle tree including a root node associated the preservation object, branch nodes from the root node for each portion of the preservation object, and additional nodes, the branch nodes and the additional nodes each including an importance rank, wherein each Merkle tree includes, stored in an inner node connected at least one of the branch nodes, a fixity value for each branch node based on and a fixity function stored in the fixity table, the fixity value being used to determine if the preservation object has been altered.

10. The system of claim 9, wherein the system is configured to determining that one or more of the fixity functions has become obsolete and to update the fixity table to replace the obsolete fixity function.

11. The system of claim 10, wherein the system is configured to recalculate the fixity value for each value of each branch node that had an importance value assigned to the fixity function that changed.

12. The system of claim 9, further comprising:
- a graphical user interface to display a retrieved content object.

13. The system of claim 9, wherein all of the preservation objects are Open Architecture Information System Archival Information Packages.

14. The system of claim 9, wherein at least one of the preservation objects is not an Open Architecture Information System Archival Information Package.

15. The system of claim 9, wherein the preservation object includes content information and preservation descriptive information.

* * * * *